Nov. 30, 1954 R. J. HARKENRIDER 2,695,823
LUBRICATOR FOR DIESEL LOCOMOTIVE TRACTION
MOTOR SUSPENSION BEARINGS
Filed June 28, 1951 4 Sheets-Sheet 1
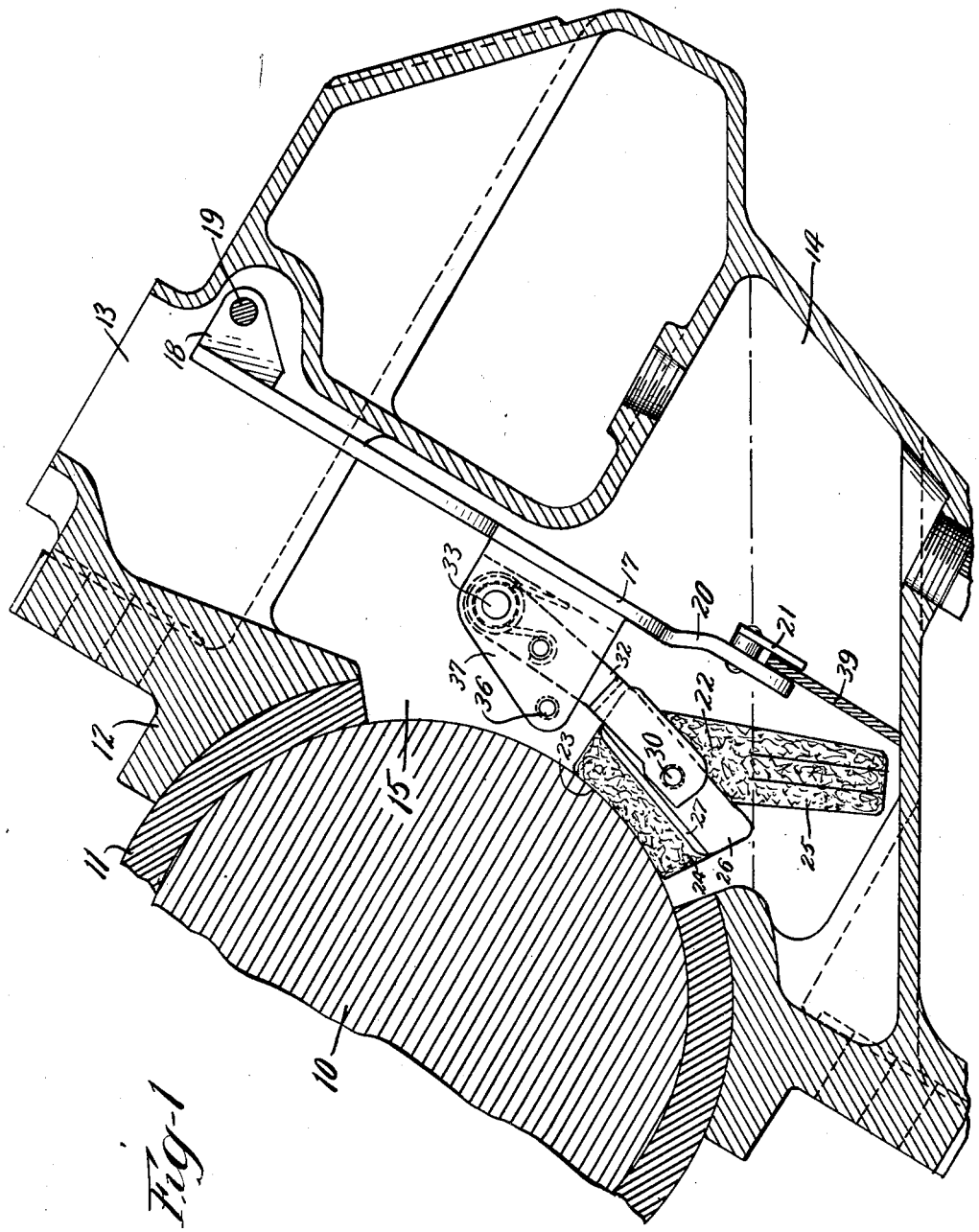
INVENTOR.
Robert J. Harkenrider
BY
Mann, Brown and Hansmann
Attys.

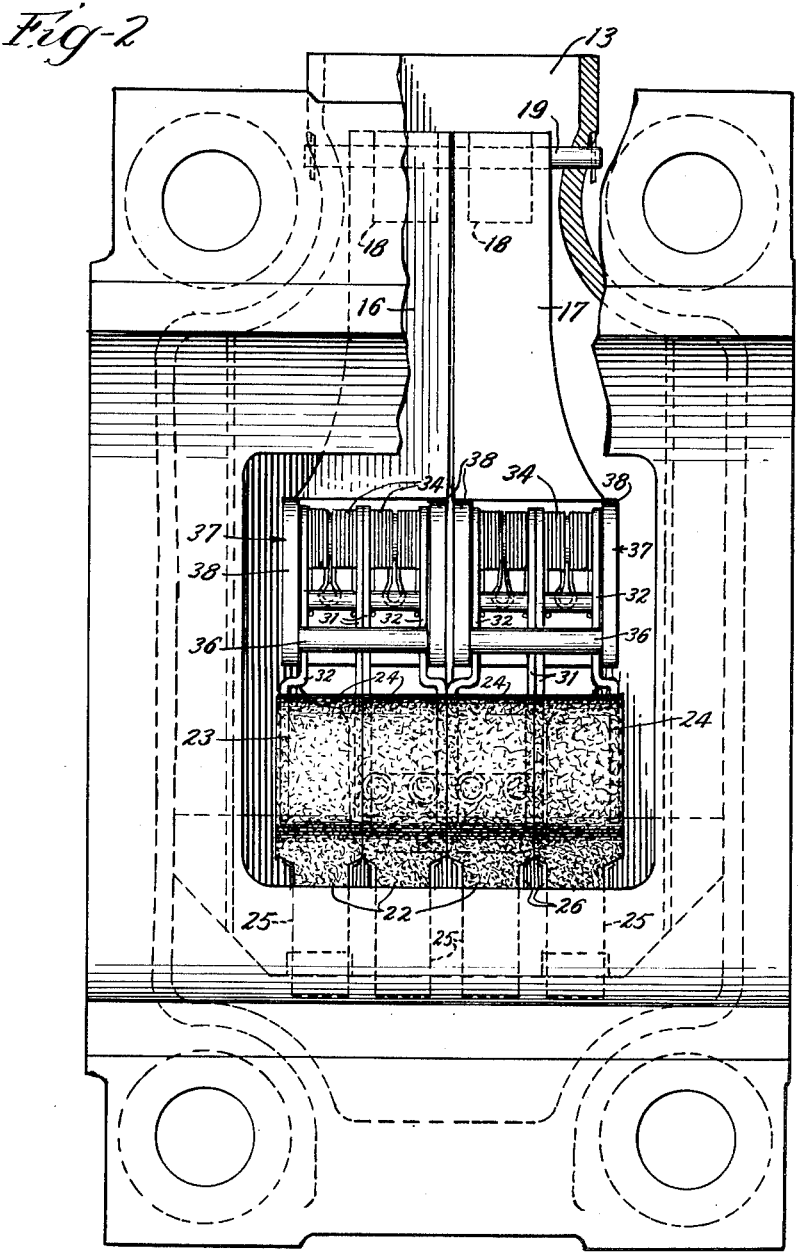

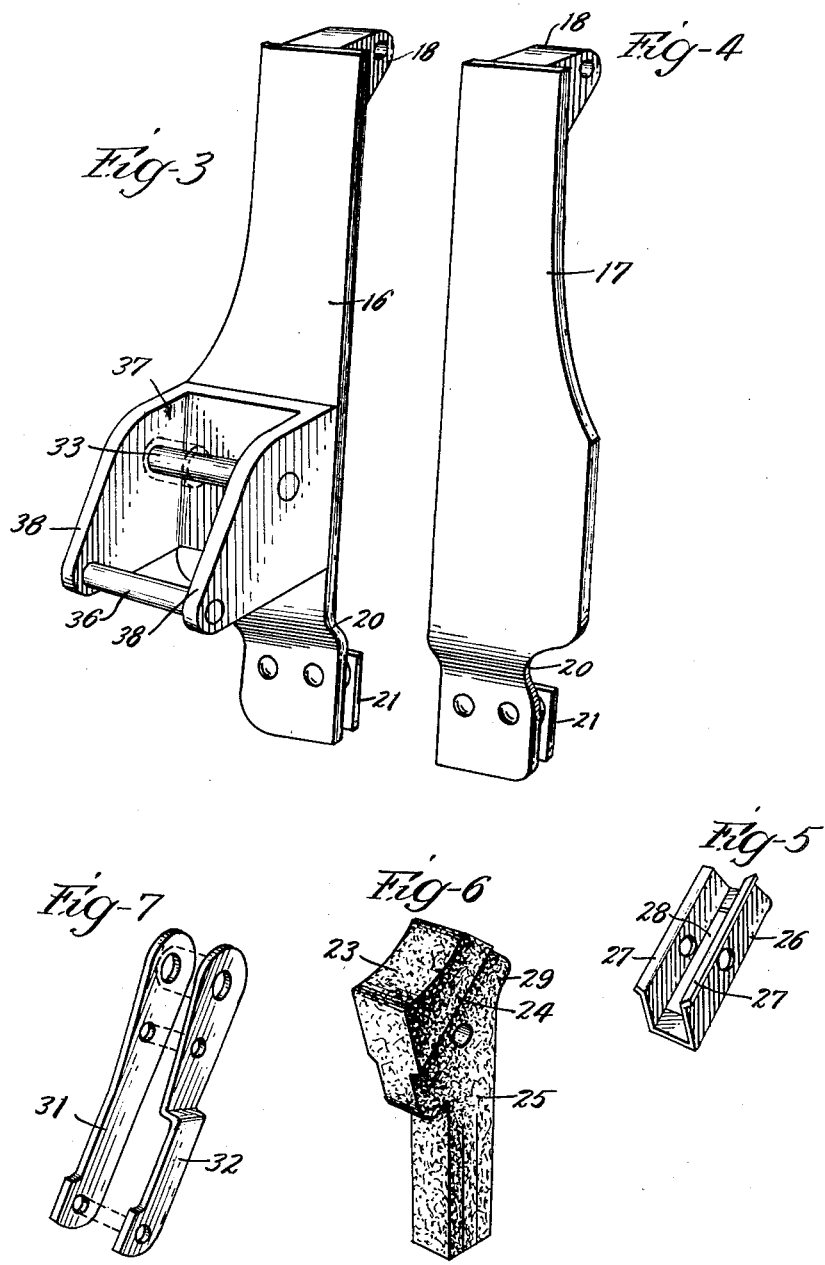

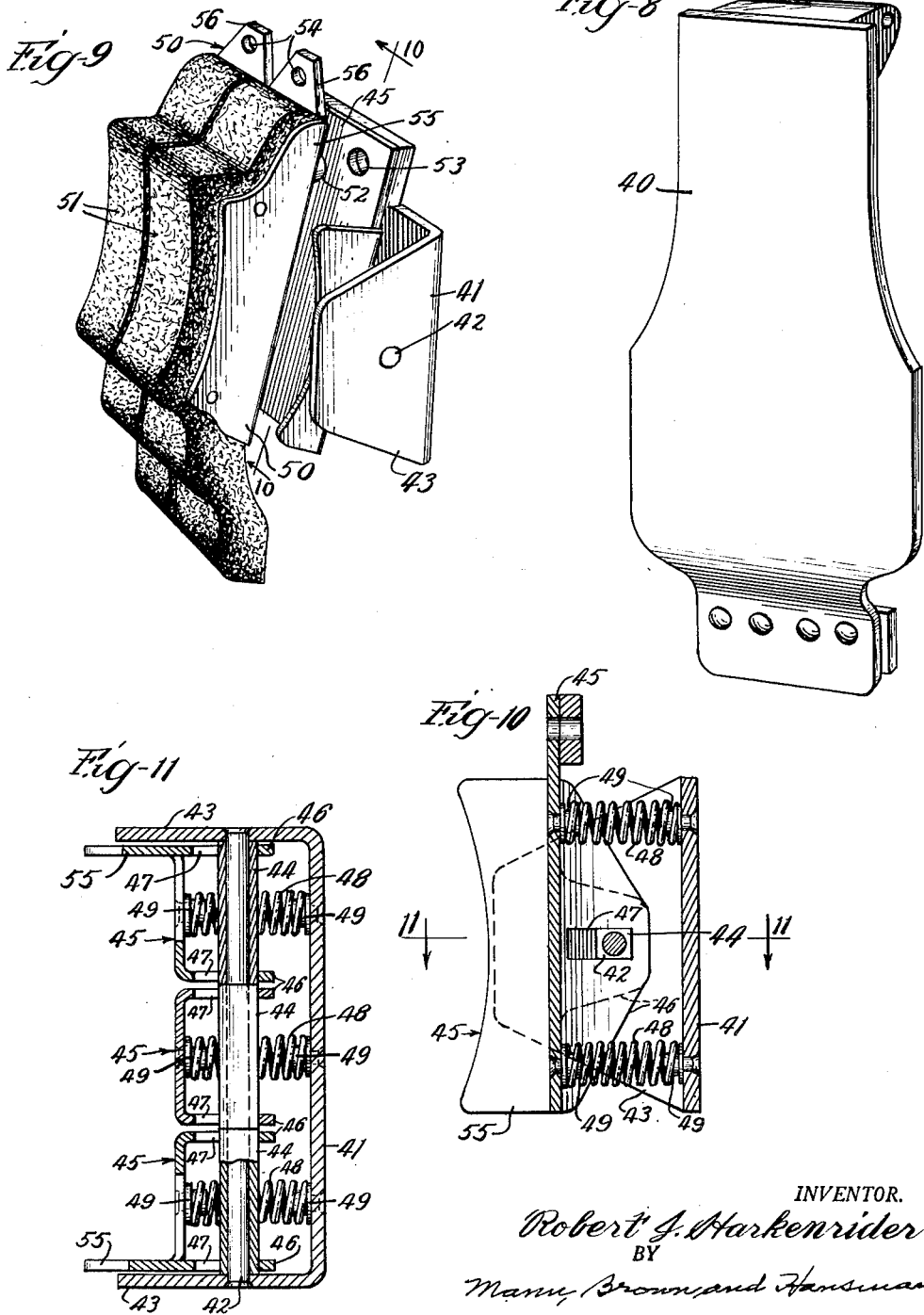

United States Patent Office 2,695,823
Patented Nov. 30, 1954

2,695,823

LUBRICATOR FOR DIESEL LOCOMOTIVE TRACTION MOTOR SUSPENSION BEARINGS

Robert J. Harkenrider, Winona, Minn., assignor to Gladys D. Miller, Winona, Minn.

Application June 28, 1951, Serial No. 233,974

7 Claims. (Cl. 308—132)

In many diesel electric locomotives, which were intended to have the journals lubricated by waste and oil, the filling opening in the axle cap is too small to admit felt lubricators having sufficient width to cover the journal properly.

The principal object of this invention is to provide felt lubricators that can be installed in those axle caps and serviced through the small filling openings.

Other objects and advantages of the invention will appear as the disclosure proceeds and the description is read in connection with the accompanying drawings, in which Fig. 1 is a sectional view through an axle journal and an axle cap intended to be lubricated by waste and oil with the felt lubricator installed;

Fig. 2 is an elevation of the assembly with the axle removed and a portion of the cap broken away;

Figs. 3 and 4 are perspective views of companion mounting plates which replace the waste pusher and form the mounting for the felt lubricator;

Fig. 5 is a perspective view of a felt holder;

Fig. 6 is a perspective view of a felt applicator;

Fig. 7 is a perspective view of a pair of levers by which the felt and holder, shown in Figs. 5 and 6, are mounted on the base;

Fig. 8 is a perspective view of another form of mounting plate for a different form of lubricator;

Fig. 9 is a perspective view of a lubricator for the mounting plate shown in Fig. 8;

Fig. 10 is a section on the line 10—10 of Fig. 9; and

Fig. 11 is a section on the line 11—11 of Fig. 10.

In Fig. 1, the axle 10 is shown with the liner 11 of the journal bearing and associated with an axle cap 12 having a filling opening 13, an oil reservoir 14, and a window opening 15 exposing a portion of the journal to be lubricated by packing waste through the filling opening 13.

The waste is urged toward the journal 15 by a so-called waste pusher, which has been removed and replaced by a pair of mounting plates 16 and 17 having hinge pieces 18 adapted to receive the hinge pintle 19 that formerly supported the waste pusher. The lower ends of the plates 16 and 17 are offset at 20 and provided with fittings 21 to make the plates fast and prevent swinging about the hinge pintle 19.

The oil from the reservoir is lifted and applied to the journal by felt applicators 22, each of which has an arcuately curved surface 23 (Fig. 6) on a thickened portion 24, from which a wick section 25 depends to dip into the oil in the reservoir 14 and raise it to the applicator surface.

Each felt applicator is equipped with a holder 26, generally channel shaped, with flaring flanges 27 and having an opening 28 to receive the reduced portion 29, which lies between the applicator section and the wick.

Each applicator and holder assembly is hinged on a pin 30 between a pair of levers 31 and 32, fulcrumed on a hinge pintle 33 and urged toward the journal by springs 34, wound about the hinge pintle 33, as best shown in Figs. 1 and 2.

The levers 31 and 32 are arranged as best shown in Fig. 2 in order to present the felt applicators within the window opening and apply the curved surfaces 23 to the journal. The levers are in pairs, 32 being offset in each pair, in order to provide the clearance as shown in Fig. 2, which will enable each half of the lubricator to be inserted and removed independently of the other through the narrow filling opening 13.

The individual applicators are self-adjusting in respect to the surface to be lubricated, and will cover that surface throughout a long period of wear.

In order to prevent the holders 26 from actually striking the journal when the felt is worn down, there is a stop pin 36 to limit the movement of the levers toward the journal.

The hinge pintles 33 are mounted in bases 37 fixed to the plates 16 and 17 and having parallel flanges 38, in which the pintles are mounted.

At first installation, the two plates 16 and 17 with their appliances may be inserted through the window opening 15 into the axle cap before the cap is placed on the journal. Alternatively, they can be inserted, one at a time, through the filling opening 13 after the cap has been put on the journal.

They are made fast by slipping the fittings 21 over the limit flange 39 and inserting the hinge pintle 19.

In servicing the lubricator, the hinge pintle 19 is removed and each section of the lubricator separately removed for a change of felt applicators, or other repairs.

The form shown in Figs. 8–11 includes a mounting plate 40 adapted to replace the waste pusher in much the same fashion as the mounting plates 16 and 17. It is equipped with a channel-shaped base 41 having a hinge pintle 42 extending across between the flanges 43 and provided with hinge blocks 44.

On the base are carriers or supporting members 45 which have downturned flanges 46 slotted at 47 to receive the blocks 44. Each carrier is urged away from the base by two springs 48 having their ends engaged with spring guides 49 on the base and the carriers, respectively.

This manner of mounting the carriers or supporting members makes each one free to move toward and away from the base and to rock about the pintle 44, thereby adjusting itself to its proper position.

Each carrier is equipped with a felt holder 50 (Fig. 9) holding a felt body 51 and having a pin 52 adapted to be received in an opening 53 in the corresponding carrier. In this manner, the felt bodies are constantly urged toward the journal to make them adjust themselves to the surface to be lubricated, and also to hold the pins 52 in place in the holes 53. The outside carriers have flanges 55 to hold the felt holders in place laterally.

This type of construction is more fully described in detail in my companion application Ser. No. 232,812, filed June 21, 1951, now Patent No. 2,676,070, granted April 20, 1954.

Each felt holder has an extension 56 provided with an opening 54 to receive a hook by which the applicator can be removed through the filling opening 13.

In this form, the mounting plate 40 would ordinarily be inserted through the window opening 15, for it is too wide to pass through the filling opening 13. It can be inserted and made fast before the axle cap is applied to the journal either at that time or later. The felt bodies can be inserted or removed one at a time through the filling opening 13.

I claim:

1. In combination with a traction motor suspension journal, a mounting plate replacing the waste pusher hinged at one end to an axle cap having a window opening to expose the journal to be lubricated and an oil reservoir below the window opening, means to hold the plate fast, a base on the plate, levers hinged to the base adjacent to one end, resilient means adapted to urge the levers toward the window opening, a felt holder hinged to the levers opposite to the window opening, and a felt body in the holder having an arcuately rounded surface for contact with the journal to be lubricated and a depending portion forming a wick adapted to raise oil from the reservoir to the rounded surface, the axes of all of said hinges being parallel to the journal axis.

2. In combination with a traction motor suspension journal, a pair of mounting plates replacing the waste pusher hinged at one end side by side to an axle cap having a window opening to expose the journal to be lubricated and an oil reservoir below the window opening, a base on each mounting plate, levers hinged to the bases adjacent to one end, resilient means adapted to urge the levers toward the window opening, a felt holder hinged to the levers opposite the window opening, and a felt body in the holder having an arcuately rounded surface for contact with the journal to be lubricated and a depending portion forming a wick adapted to raise oil from the reservoir to the rounded surface, the axes of all of said hinges being parallel to the journal axis.

3. In combination with a traction motor suspension journal, a pair of mounting plates replacing a waste pusher hinged at one end side by side to an axle cap having a window opening to expose the journal to be lubricated and an oil reservoir below the window opening, a base on each plate, offset levers hinged to the bases adjacent to one end, resilient means adapted to urge the levers toward the window opening, a felt holder hinged to the levers opposite the window opening, and a felt body in the holder having an arcuately rounded surface for contact with the journal to be lubricated and a depending portion forming a wick adapted to raise oil from the reservoir to the rounded surface, the axes of all of said hinges being parallel to the journal axis.

4. In combination with a traction motor suspension journal, a pair of offset mounting plates replacing the waste pusher hinged at one end side by side to an axle cap having a window opening to expose the journal to be lubricated and an oil reservoir below the window opening, a base on each plate, offset levers hinged to the bases adjacent to one end, resilient means adapted to urge the levers toward the window opening, a felt holder hinged to the levers opposite the window opening, and a felt body in the holder having an arcuately rounded surface for contact with the journal to be lubricated and a depending portion forming a wick adapted to raise oil from the reservoir to the rounded surface, the axes of all of said hinges being parallel to the journal axis.

5. In combination with a traction motor suspension journal, a mounting plate replacing the waste pusher hinged at one end to an axle cap having a window opening to expose the journal to be lubricated and an oil reservoir below the window opening, means to hold the plate against swinging, a base connected to the plate opposite to the window opening, a plurality of supporting members alongside each other on the base, hinge means separately mounting each of said supporting members on the base with individual freedom to rock and to resiliently yield to pressure toward the base, a felt holder for each supporting member, and a felt body retained in said holder and having an arcuately rounded journal contact surface projecting from the holder, said supporting member and said felt holder having contacting surfaces and one of said surfaces having a stud projecting therefrom for engagement within an opening in the other surface to retain the felt holder in position on the supporting member, the axes of all of said hinges being parallel to the journal axis.

6. In combination with a traction motor suspension journal, a mounting plate replacing the waste pusher hinged at one end to an axle cap having a window opening to expose the journal to be lubricated and an oil reservoir below the window opening, means to hold the plate against swinging, a base on the plate, a plurality of supporting members alongside each other on the base, each having an opening, hinge means separately mounting each of said supporting members on the base for individual freedom to rock and to resiliently yield to pressure toward the base, a felt holder for each supporting member having a stud to be received in a corresponding opening, and a felt body retained in each of the holders and having an arcuately rounded journal contact surface projecting from the holder, the axes of all of said hinges being parallel to the journal axis.

7. In combination with a traction motor suspension journal, a mounting plate replacing the waste pusher hinged at one end thereof to an axle cap having a window opening to expose the journal to be lubricated and an oil reservoir below the window opening, means to hold the plate against swinging, a base on the plate, supporting members alongside each other on the base, hinge means separately mounting each of said supporting members on said base, said hinge means allowing said supporting members to rock independently of each other, resilient means urging said supporting members away from said base, a felt holder removably carried by each supporting member, and a felt body retained in said holder and having an arcuately rounded journal contact surface projecting from the holder, the axis of all said hinges being parallel to the journal axis.

References Cited in the file of this patent

UNITED STATES PATENTS

| Number | Name | Date |
|---|---|---|
| 334,013 | Gibbons | Jan. 12, 1886 |
| 358,583 | Timms | Mar. 1, 1887 |
| 2,021,715 | Cooper | Nov. 19, 1935 |
| 2,540,829 | Miller | Feb. 6, 1951 |